United States Patent

[11] 3,604,552

[72] Inventor Leslie James Marshall
Reigate, England
[21] Appl. No. 853,109
[22] Filed Aug. 26, 1969
[45] Patented Sept. 14, 1971
[73] Assignee Redland Tiles Limited
Reigate, Surrey, England
[32] Priority Sept. 9, 1968
[33] Great Britain
[31] 42,883/68

[54] CONVEYING APPARATUS FOR SPLITTING A SINGLE STREAM OF ROOFING TILES ON PALLETS INTO TWO STREAMS
7 Claims, 16 Drawing Figs.

[52] U.S. Cl. .................................................. 198/31
[51] Int. Cl. ...................................... B65g 47/30
[50] Field of Search ........................................ 198/31 A, 31 T, 20 T, 102, 81, 34, 31

[56] References Cited
UNITED STATES PATENTS
2,884,115  4/1959  Farrer ........................ 198/31 X
3,348,655  10/1967  Pierce et al. ................. 198/34

Primary Examiner—Joseph Wegbreit
Attorney—Young & Thompson

ABSTRACT: A tile manufacturing plant includes apparatus for dividing a stream of freshly moulded tiles on pallets into two streams, comprising a first conveyor which carries the pallets at regular intervals and a second conveyor, synchronized with the first, which removes selected pallets from the first conveyor to form a second stream. The second conveyor comprises two parallel chains, situated one on each side of the first conveyor and diverging upwardly from the path thereof, the chains having at intervals along their lengths lifter sections to engage under and lift pallets on the first conveyor. The plant also includes apparatus for loading the streams of pallets into racks for curing the tiles, and for unloading the racks.

CONVEYING APPARATUS FOR SPLITTING A SINGLE STREAM OF ROOFING TILES ON PALLETS INTO TWO STREAMS

The invention relates to tile-making apparatus, and more particularly to apparatus for dividing a single stream of tiles on pallets.

The invention provides apparatus for splitting a single stream of 'green' tiles on pallets into two streams, comprising a first conveyor on which the single stream of pallets is carried with the side edges of the pallets projecting laterally from the conveyor and a second conveyor having a path which diverges upwardly relative to the path of the first conveyor and which has means to engage beneath the side edges of selected pallets to carry those pallets away from the first conveyor while the remaining pallets continue on the first conveyor, means being provided to synchronize in timed relationship the positions of the pallets on the first conveyor and the engaging means on the second conveyor. The pallet engaging means may also be engageable against the side edges of each pallet.

The second conveyor and lifting means may comprise a pair of endless chains situated one on each side of the first conveyor and having lifter sections spaced at intervals along the length of each chain, each pair of said lifter sections being engageable with a pallet to lift it, the spacing between successive pairs of lifter sections being such as to permit the passage of at least one pallet along the first conveyor without lifting such pallet or pallets.

Each lifter section may comprise a series of units arranged together along each chain, each unit having an upright portion with means for attachment to each chain, a support portion to support a pallet, and means to engage the side edge of a pallet. The support portion of each unit may be adjustable so that each lifter section gives uniform support to a pallet having a curved longitudinal section at the side edge thereof.

Preferably, each lifter section is provided with rollers engageable with a fixed track to support the lifter section while conveying a pallet.

The first conveyor may comprise a pair of parallel ropes spaced to support the pallets adjacent to and spaced from their side edges. A further chain parallel to the ropes and having dogs at intervals along the length thereof to engage the pallets supported by the ropes, and means to drive the further chain at a speed higher than that of the ropes by an amount such that, before the pallets reach the second conveyor, each pallet will be overtaken and drivably engaged by a dog despite irregularities in the supply of pallets to the conveyor.

A third conveyor may be provided to receive and carry the pallets removed from the first conveyor by the second conveyor.

The invention also provides a method of splitting a single stream of 'green' tiles on pallets into two streams, comprising the steps of feeding the single stream of pallets along a first conveyor in timed relationship with a second conveyor having a path which diverges upwardly relative to the path of the first conveyor and which second conveyor has means to engage and lift pallets on the first conveyor, and lifting selected pallets from the first conveyor by means of the second conveyor to form one of the two streams, the pallets that remain on the first conveyor forming the other of the two streams.

An example of part of a tile plant incorporating a specific embodiment of the invention will now be described with reference to the accompanying drawings, in which.

When the plant is in operation, the 'green' tiles on pallets are fed to a machine which removes each alternate pallet from the main stream to form a secondary stream. This apparatus is shown in FIGS. 1 to 5. The two streams of pallets are then fed into racks simultaneously, and at the same time tiles which have been cured are removed from the racks on their pallets. The apparatus for carrying out these operations is shown in FIGS. 6 to 11. The two streams of cured tiles on pallets coming from the racks are united into a single stream by the machine shown in FIGS. 12 to 14, before the tiles are separated from the pallets.

Figures 1A, 1B:
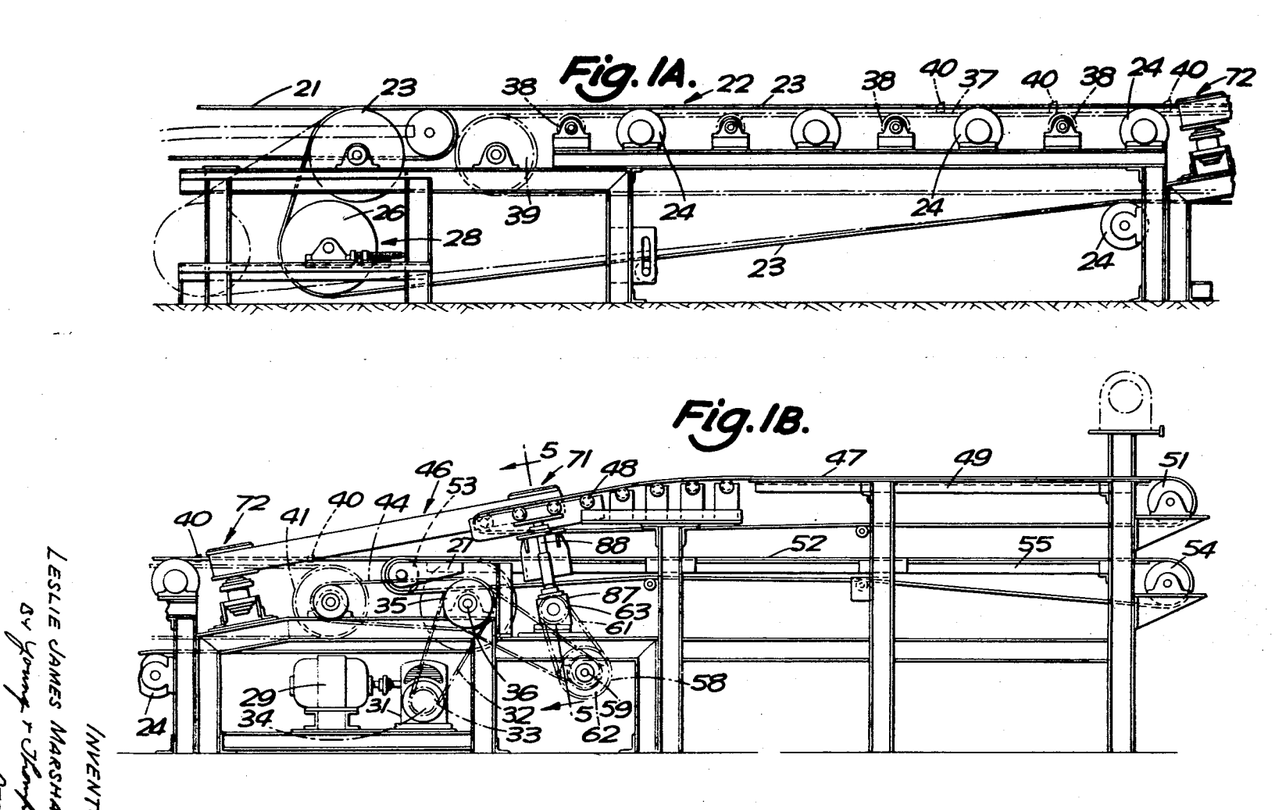
FIG. 1a and 1b is a side view of the apparatus for splitting the stream of pallets from a tile extrusion machine.
Figure 2A:
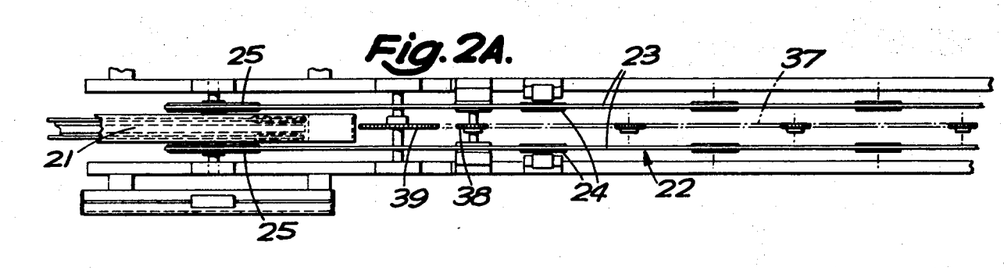
FIG. 2a and 2b is a plan view of the apparatus of FIG. 1.
Figure 2B:
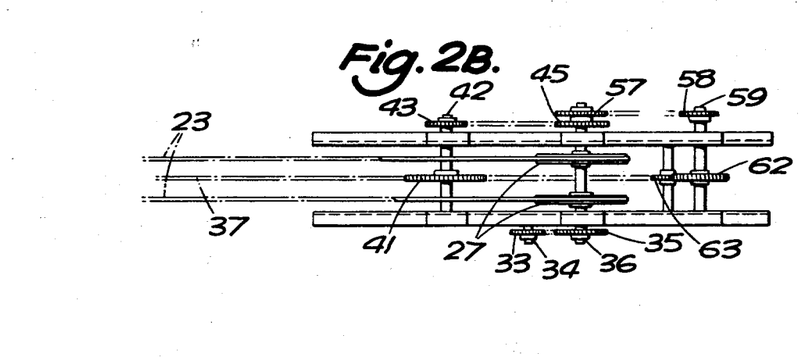

First the apparatus used to divide the stream of 'green' tiles and pallets will be described. Referring to FIGS. 1 and 2, a conveyor belt 21 leads from a conventional tile extrusion machine to a rope conveyor 22, which comprises two ropes 23 running on pulleys 24, 25, 26 and 27. Tensioners are provided at 28, and the conveyor is driven by a motor 29 through a gearbox 31 and a chain 32, which chain engages sprocket wheels 33 on the gearbox output shafts 34 and 35, on the shaft 36 of pulleys 27. For greater flexibility of operation, a variable speed drive unit may be interposed between the motor 29 and the gearbox 31.

Between the ropes 23 of the conveyor 22 runs a chain 37, supported by sprocket wheels 38 and 39 and driven by a sprocket wheel 41 on a shaft 42. The shaft 42 is driven by a sprocket wheel 43 and chain 44 from a sprocket wheel 45 on a shaft 36, the sizes of wheels 43 and 45 being chosen so that the chain 37 travels faster than the ropes 23. Along the length of chain 37, dogs 40 are provided spaced at intervals rather greater than the length of a pallet. Each dog is engageable with a pallet on the rope conveyor.

Near the tail of the conveyor 22 is provided a pallet lifter 46 (the operation of which is described below), which lifts alternate pallets from the conveyor 22 and transports them to a conveyor belt 47. The belt 47 is supported by rollers 48, flanges 49 and a roller 51, and extends towards the tile racking machine. Below the conveyor 47 is a similar parallel conveyor 52 supported by rollers 53, 54 and flanges 55, and the tiles which are not lifted continue along the conveyor 52.

The pallet lifter 46 is driven by a train comprising a chain 56 from a wheel 57 on shaft 36 to a wheel 58 on a lay shaft 59, and a chain 61 from a wheel 62 on shaft 59 to a wheel 63. This ensures that the lifter is in synchronism with the dogs 40. The lifter 46 is shown in greater detail in FIGS. 3, 4 and 5.

When the apparatus is operating, 'green' tiles on pallets pass in a head-to-tail stream from the tile extrusion machine onto conveyor belt 21, and then pass onto the rope conveyor 22. It is desirable that the pallets arrive at the lifter 46 with spaces between them, and to achieve this the chain 37 moves below the conveyor 22 and each dog 40 engages and drives a pallet over the ropes 23. As the spacing between successive dogs 40 is greater than the length of a pallet, it is necessary that the chain 37 travels at a higher speed than the ropes 23, both to ensure that each dog 40 engages a pallet and also to prevent an accumulation of pallets before the conveyor 22.

The pallet lifter 46 lifts alternate pallets and transports them to conveyor 47, while the pallets not so lifted pass onto conveyor 52. The conveyors 47, 52 transport the pallets in two similar streams to the pallet racking machinery.

Figure 3:
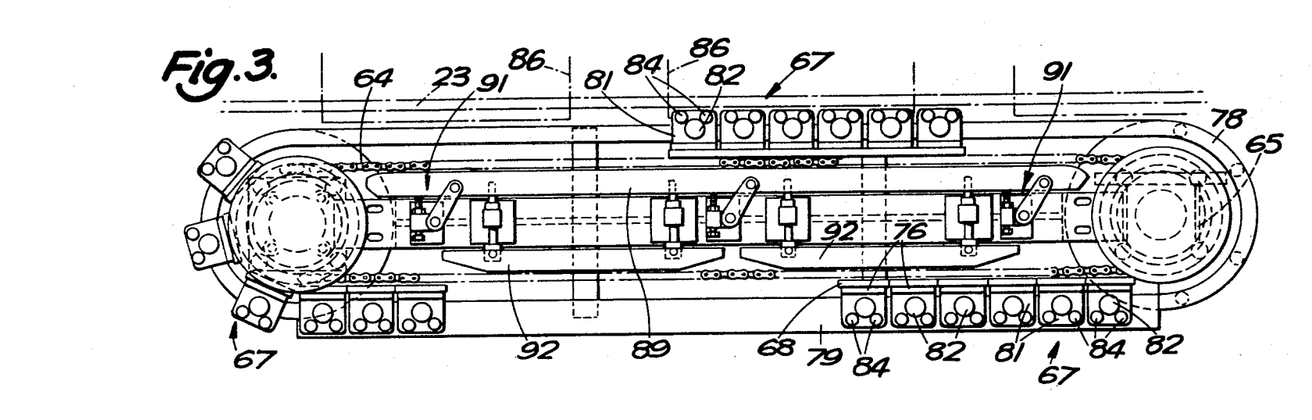
FIG. 3 is a plan view of the pallet lifter comprising part of the apparatus of FIG. 1.
Figure 4:
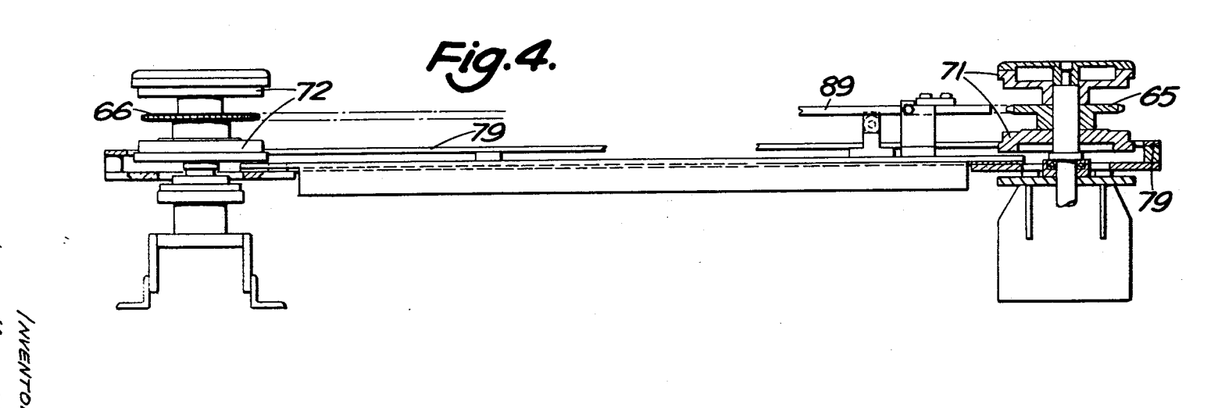
FIG. 4 is an incomplete side view of the apparatus of FIG. 3, partly in section.
Figure 5:
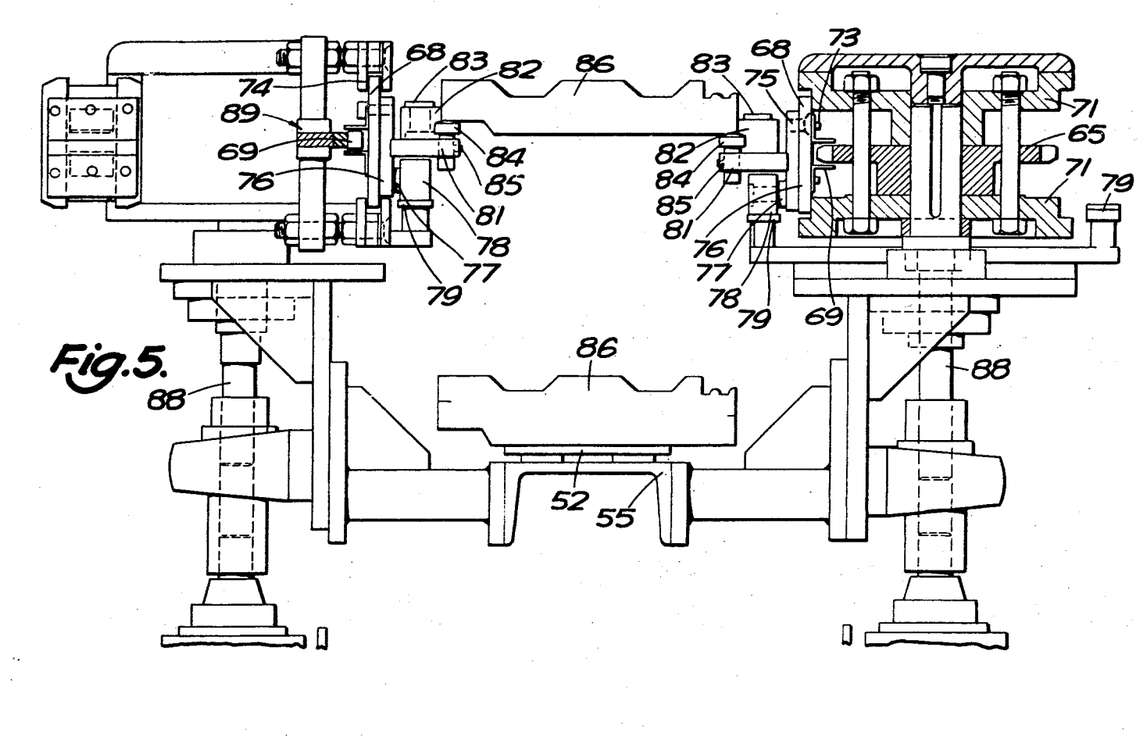
FIG. 5 is a cross-sectional view of the apparatus of FIG. 3 taken on the line 5—5 in FIG. 1.

The pallet lifter 46 will now be described in greater detail. The lifter comprises two corresponding parts, one on each side of the conveyor 22, and it will be understood that the description applies equally to both parts. Referring to FIGS. 3, 4 and 5, a chain 64 passes over sprocket wheels 65 and 66. Attached to the chain 64 are lifter sections 67, the lengths of sections 67 and of the chain inbetween the sections 67 being substantially the same as the distance between successive dogs 40 on chain 37.

Each lifter section 67 comprises a series of plates 68 attached to the chain links 69 on their backs by screws 73. The plates are supported by pulleys 71, 72 at the sprocket wheels 65 and 66, and travel in channels 74 in the run between the pulleys 71, 72. Attached to each plate 68 by screws 75 is a smaller plate 76. The plate 76 carries an axle 77 supporting a resilient roller 78, which runs on a continuous track 79, thereby supporting the plate 76 and associated items.

Also attached to each plate 76 is a horizontal plate 81, carrying a resilient roller 82 on an axle 83, and two supports 84, capped with resilient material, which are adjustable relative to the plate 81 in a vertical direction, and which may be secured by a screw 85. The construction of the apparatus is such that the distance between the rollers 82 of the corresponding lifters 67 on each side of the conveyor 22 is equal to or slightly less than the width of a pallet 86.

The lifter 46 is driven by a chain to the wheel 63, whence the drive is taken by bevel gear boxes 87 and shafts 88 to the sprocket wheels 65 and pulleys 71. The speed of the drive is chosen so that the lifter sections 67 remain in phase with every second dog 40 on chain 37.

When the lifter is in operation the pallets 86 tend to force opposed lifter sections 67 apart. To resist this force a chain support 89 is provided along the length of the lifter 46, the support being adjustable at 91. Two chain tensioners and dampers are provided at 92.

Before operation of the lifter 46 the parts on either side of the conveyor 22 are aligned so that a lifter section 67 on one part is opposite an identical section 67 on the other part. The positions of the opposed lifter sections 67 are aligned with alternate dogs 40. The posts 84 are adjusted in their plates 81 so that a pallet 86 lying on two opposed sections 67 is supported uniformly along its length by them.

When the machine is in operation pallets 86 travel along ropes 23, each driven by a dog 40. As the front of each second pallet 86 passes pulley 72 (see FIG. 1), the leading edges of a pair of lifter sections 67, travelling in the same direction, pass around the pulleys 72 and, from below the side of conveyor 22, engage and pick up the front of the pallet 86, the sides of which overhang the sides of the conveyor 22. As the drive continues the whole pallet is picked up from the conveyor 22 and carried between two lifter sections 67, supported by posts 84 and held firmly by the rollers 82, the lifter sections 67 being supported by rollers 78. At the upper end of the lifter 46 the pallet 86 passes onto conveyor 47, and is released from the lifter as the sections 67 pass around the pulleys 71.

The pallets not picked up by lifters 67 are passed by a plain section of chain 64, and pass onto conveyor 52, below conveyor 47.

After the stream of pallets has been split into two, as described above, the pallets and tiles are stacked in racks to be cured. The apparatus used comprises a feeder to feed two streams of tiles into the racks, and a rack machine which manipulates the racks during this process. The feeder will be described first, and then the rack machine.

Figure 6:
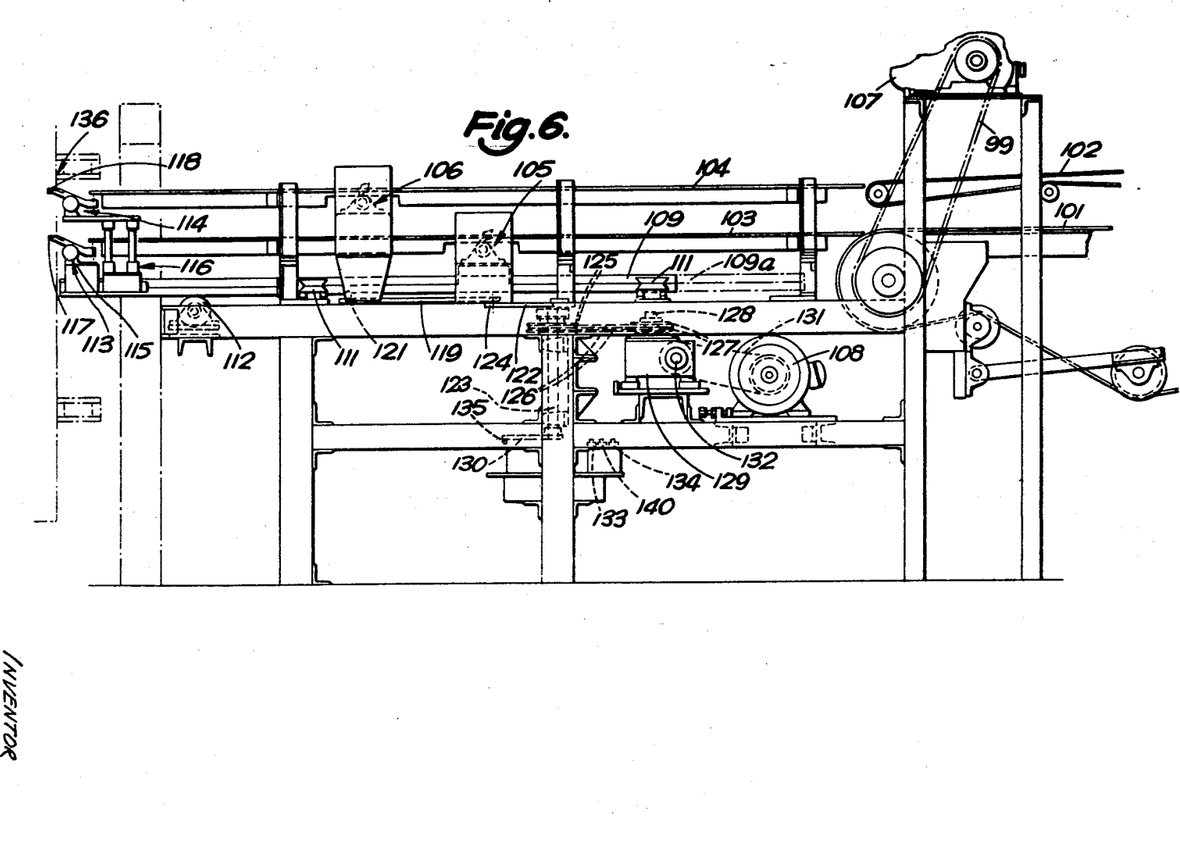
FIG. 6 is a view of the apparatus used to feed the two streams of pallets simultaneously into the racks.

Referring to FIG. 6, two conveyors 101, 102 transport tiles on pallets from the stream-splitting machine described above. At the ends of the conveyors 101, 102 are two slideways 103, 104, which support the pallets at their side edges only, so that a central strip of each pallet is unsupported. Slideway 104 is directly above slideway 103, spaced from it by twice the distance between adjacent shelves in a rack, and both slideways terminate at the entry to the racks in the racking machine. Towards the further end of the slideways 103, 104 are counters 105, 106 positioned below the slideways and operated by the passage of pallets. Counter 105 is connected to the controls of motor 107, which drives conveyor 101 through a belt 99, and counter 106 is connected to the controls of the motor (not shown) which drives conveyor 102.

Both counters 105 and 106 are connected, by means of an 'AND' logic gate, to the controls of a motor 108.

Underneath and the to the slideway 103 is positioned a beam 109. The beam 109 is square in cross section, SECTION with one diagonal vertical so that it may be supported by jockey wheels 111, 112, which have rectangular grooves, to allow motion of the beam 109 parallel to the slideways 103, 104. The beam is shown fully extended. The dotted outline 109l shows the retracted position.

At the end of the beam 109 remote from the conveyors 101, 102, i.e. at the end nearest the racking machine, there are provided trip-catches 113, 114. The trip-catch 113 is pivotally supported in trunnions 115, and the catch 114 is pivotally supported on a pylon 116 so that it lies above catch 113. Both trip-catches are biassed so that their noses 117, 118 tend to rise, but a stop (not shown) prevents them from rotating clockwise beyond the position shown. The heights of their mountings are such that, when in the position shown, the trip-catches 113, 114 will engage the underside of pallets on the slideways 103 and 104 as the beam 109 is moved axially to the left (as viewed in FIG. 6) relative to the pallets, but when the motion is reversed the catches pivot and disengage.

A crank 119 is pivotally connected to the beam 109 at 121, and a further crank 122, on axle 123, is connected to crank 119 at 124. In FIG. 6 both cranks 119 and 122 are shown parallel to the beam 109. The axle 123 carries two pulleys 125, which are connected by belts 126 to pulleys 127 on the output shaft 128 of a gearbox 129, the input shaft 132 of the gearbox 129 being connected to motor 108 by belt 131.

The shaft 123 also carries at its lower end a radially extending arm 130 with a projection 135, which is positioned to operate three microswitches 133, 140, 134 as the shaft 123 rotates. The microswitch 134 is operated when the crank 122 extends fully rearwardly, and is connected to the controls of the motor 108. The microswitch 140 is operated before the switch 134, and resets the logic gate, while the microswitch 133 is operated even earlier, and is connected to the drive of the rack machine.

When the apparatus is operating, the beam 109 is initially retracted and the motor shelves is stopped. The conveyors 101 and 102 feed pallets onto the slideways 103 and 104, and the pallets are driven along the slideway in a head-to-tail stream by the force from succeeding pallets. At the other end of the slideways 103 and 104 is positioned a rack 136 of cured tiles, with two alternate shelves in line with the ends of the slideways 103 and 104. Thus as the 'green' tiles and pallets are driven from each slideway onto one end of a shelf of the rack, they push out the cured tiles and pallets from the other end of the shelf.

Each shelf of a rack holds a set number of pallets, say five. As the pallets pass along the slideways 103, 104 they actuate counters 105, 106, and as each counter reaches a count of five, it stops the motor driving the appropriate conveyor belt. Thus counter 105 switches off motor 107 after five pallets have passed the counter. When both counters have reached five, and both conveyors have been stopped by their respective counter, the motor 108 is started, through the 'AND' logic gate connecting the motor to the counter 105, 106.

It will be appreciated that, at this moment, the slideways 103, 104 support stationary pallets, and the rack shelves contain both green tiles on pallets and also cured tiles. The trip-catches 113 and 114 on the beam 109 are in the retracted position indicated by 109a.

When the motor 108 is started, it drives the shaft 123 by the drive system as described. Initially, the crank 122 extends to the right (as viewed in FIG. 6), but as the shaft rotates, the beam 109 is moved to the left towards its extended position. As the beam moves the trip-catches 113 and 114 each engage the underside of a pallet, and propel the pallet towards the racks together with the pallets in front of it, so that when the beam 109 is fully extended the pallets are fully loaded into the racks. It will be appreciated that because of the repetitive cycle of the machine, the catches engage every fifth pallet on the slideway. Thus the motion of the beam 109 completes the loading of the shelves of the rack, simultaneously driving out the last of the cured tiles from the shelves, and clears the end of the slideway of pallets so that the rack may be moved to bring further shelves into alignment.

As the shaft 123 continues to rotate, retracting the beam 109, the contact 135 on crank 132 operates the microswitch 133. This starts the drive of the rack machine, so that fresh shelves are moved into position. A switch on the rack machine restarts the drive to conveyors 101, 102. The shaft then rotates further so that microswitches 140 and 134 are operated, resetting the logic circuit and stopping the motor 108. The machine then repeats the above cycle.

Figure 7:
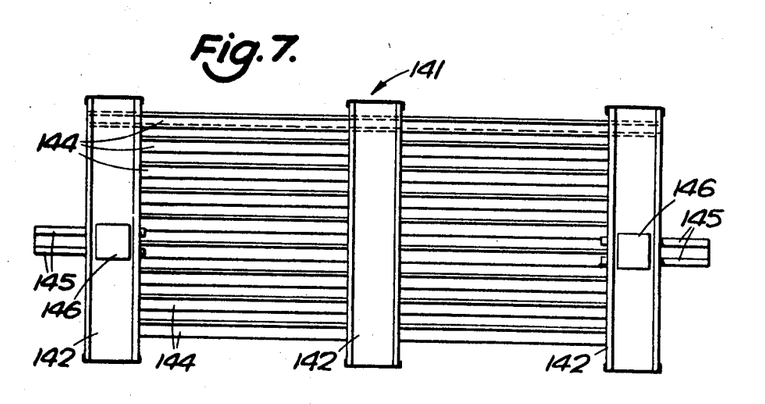
FIG. 7 is a side elevation of a rack for supporting tiles.
Figure 8:
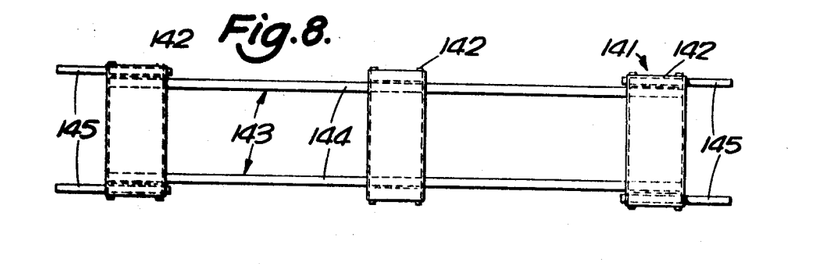
FIG. 8 is a plan of the rack shown in FIG. 7.
Figure 9:
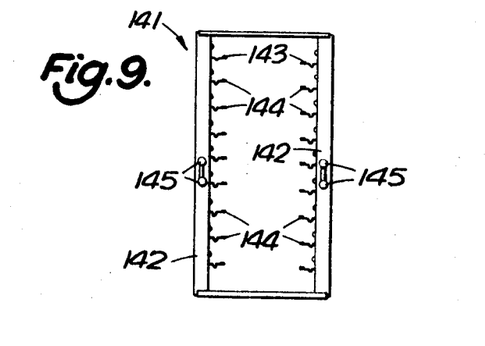
FIG. 9 is an end elevation of the rack shown in FIG. 7.

The racks on which the tiles are supported are shown in FIGS. 7, 8 and 9.

Each rack 141 comprises three pairs of upright channel members 142 which support between them a series of shelves 143, each of which comprises two parallel L-section members 144. The members 144 extend along the length of the rack. Pallets can rest between the horizontal parts of the L-section members 144, being supported at their side edges. Each rack 141 is provided at each end with two pair of rods 145, a pair being supported by a channel member 142 on each side of the rack. In each pair, one rod is parallel to and above the other. Each pair of rods 145 is situated slightly more than halfway below the top of the rack 141 and each pair passes through a casting 146 accommodated in the channel member 142 carrying the rods 145. Each rack has nine shelves, and is so constructed that, when one rack stands on top of another, the spacing between the top shelf of the lower rack and the bottom shelf of the upper rack is twice the spacing between adjacent shelves in the same rack.

Figure 10:
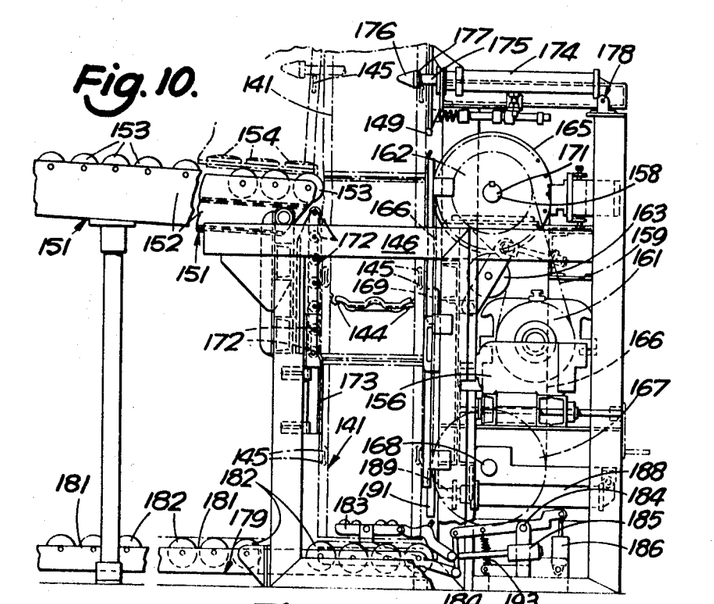
FIG. 10 is a side elevation of the apparatus for racking tiles.
Figure 11:
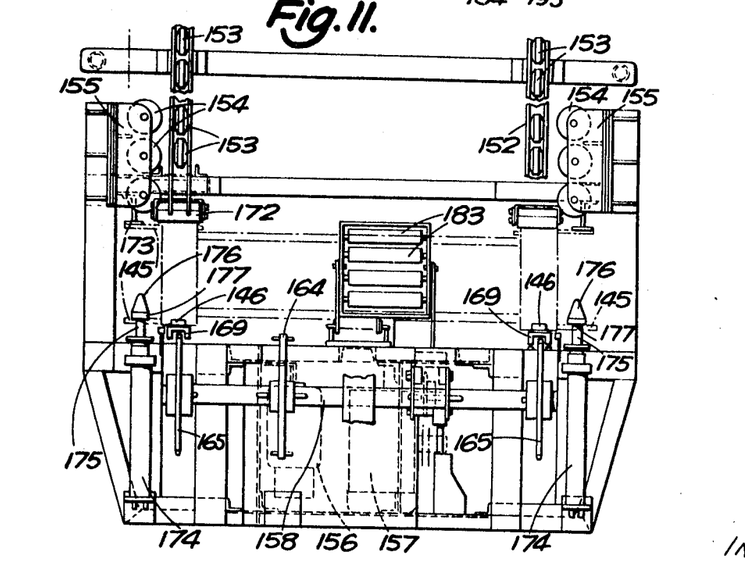
FIG. 11 is a plan of the apparatus of FIG. 10.

The tile-racking machine is shown in FIGS. 10 and 11, and comprises an upper conveyor 151 having parallel horizontal members 152 in which are journaled rollers 13 with horizontal axes. Adjacent the machine further rollers 154, with vertical axes, are provided, journaled in horizontal members 155. Racks 141 approach the machine sideways along the conveyor 151, the rollers 154 serving to steady and position the racks.

The machine is driven by an electric motor 156 which drives a gearbox 157 (by means not shown). The gearbox 157 drives a main shaft 158 by means of a chain 159, which passes around a wheel 161, on the output shaft of the gearbox 157, and a wheel 162 keyed to the main shaft 158. The chain 159 is kept at the correct tension by means of a jockey wheel 163. The main SHAFT 158 also carries a pin-wheel 164, the pins of which actuate switch 171.

Two sprocket wheels 165 are also keyed to the main shaft 158. An endless chain 166 passes around each sprocket wheel 165 and around a cooperating sprocket wheel 167 mounted on a shaft 168 below the main shaft 158. Each chain 166 is provided with dogs 169, and successive pairs of cooperating dogs (one on each chain) are adapted to support successive racks 141 on the endless chains.

At the upper end of the machine are two pneumatic cylinders 174 each containing a piston 175 having a tapered head 176, the head 176 having a shoulder 177. The cylinder is pivoted at 178. A buffer 149 between the pistons 174 is connected to the air supply to cylinders 174.

At the lower end of the machine there is a roller conveyor 179 comprising rollers 182 with horizontal axles journaled in side members 181. Below the path followed by the racks is a depressible roller platform 183, supported on a linkage having fixed pivots at 184 and counterbalanced by a weight 185. A tension spring 193 exerts a force tending to raise the platform 183, and an adjustable damper 186 controls the motion of the linkage. Movement of the platform 183 controls the air supply to cylinders 174, and also to a cylinder 188. The cylinder 188 contains a piston 189 with a pressure plate 191.

When a rack of cured tiles approaches the machine along the conveyor 151, the pistons 175 are fully extended, and the tapered heads 176 ride over the rods 145 on the rack so that the shoulders 177 engage with the racks. Operation of the air valve 187 (by means described below) admits air to the cylinders 174, causing the pistons 175 to retract, pulling the rack 141 with them. When the rack has moved off the conveyor 151, so that it rests upon the previous rack, it engages the buffer 149, which controls the air supply so that the pistons 175 extend ready to meet the next rack.

After a rack leaves the upper roller conveyor 151, it is initially supported on the top of a rack which is already being supported by a pair of dogs 169 on the endless chains 166. As the racks descend, the next pair of dogs 169 move around the upper chain-wheels 165 into position below the castings 145 to support the upper rack which has just left the upper roller conveyor 151. Racks are held against the chains by an upright row of rollers 172 and, below them, a skid 173.

The rack descends in stages, as the motor 156 rotates the mainshaft 158, with the chains 166, until fresh shelves have been aligned with the slideways 103 and 104 (FIG. 6). The pin-wheel 164 then actuates switch 171 to stop the motor 156 and to start the drives to conveyor 101 and 102. The feeder mechanism shown in FIG. 6 fills the shelves with green tiles, simultaneously driving out cured tiles, and the drive motor 156 is restarted by the action of switch 133 (FIG. 6) when the shelves are full. The shaft 158 then rotates until further shelves are in a position to be filled.

Thus each rack is lowered (in steps) by the endless chains 166 as the shelves are filled and by the time a rack is full it has reached the lower roller conveyor 179.

On reaching the conveyor 179, the rack depresses the roller platform 183. The motion of the platform 183 results in air being admitted from a supply to the cylinder 188 to operate a piston 189 in the cylinder pushing the rack off the dogs 169 onto the lower roller conveyor 179. The platform 183 then rises to its original position under the action of a spring 193, thus closing the air supply. Meanwhile the pistons 175 have drawn a further rack into the machine, as described above.

It will be appreciated that the spacing of the slideways 103 and 104, and the number of shelves 144 in each rack, may be freely varied, as may the size of the shelves 144, with appropriate modifications to the indexing system. The control system described is pneumatic, but other systems may be used with equal facility.

Figure 12:
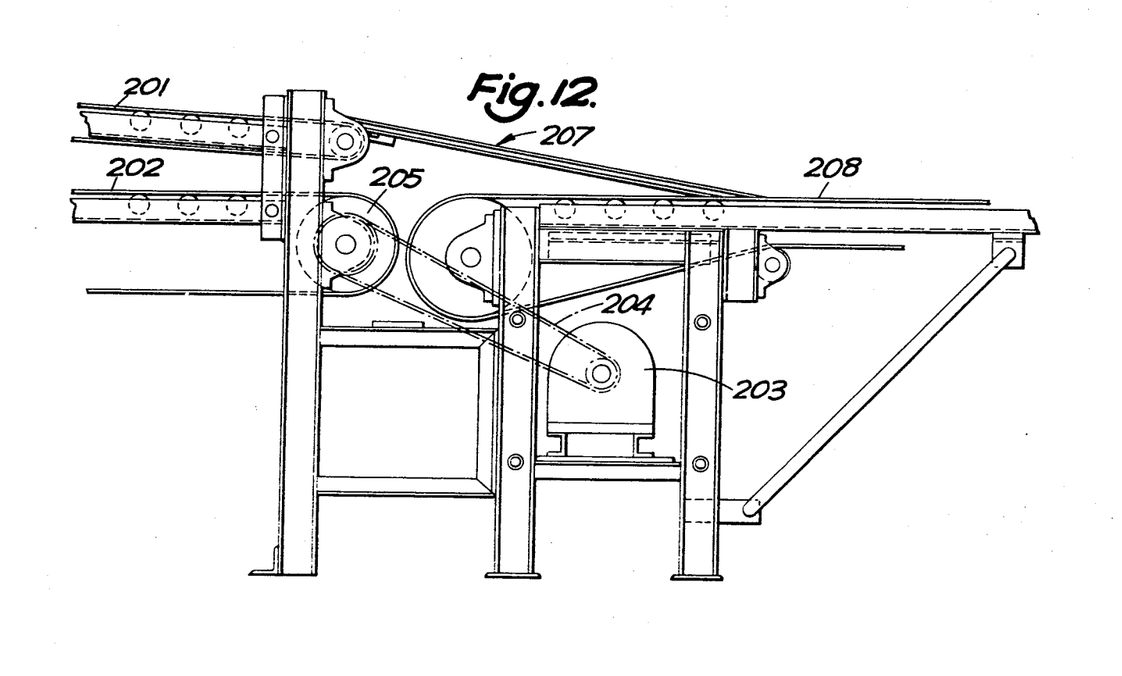
FIG. 12 is a side elevation of part of the apparatus used to unite two streams of tiles.

As referred to above, the cured tiles on pallets are ejected from the racks by the act of feeding in green tiles. Thus the cured tiles issue from the machine in two unsynchronized streams, and it is necessary to reunite these streams before passing the tiles and pallets to a point at which they are separated or split off. The apparatus used is shown in FIGS. 12, 13 and 14.

Two belt conveyor 201, 202 carry the pallets from the racking machine, conveyor 201 being driven by a motor 203, through a chain 204 to a pulley 205. The drive to conveyor 202 is not shown. A control unit, to be described in greater detail below, is situated near the midpoints of these conveyors. The pallets from the upper conveyor 201 pass down a slideway 207, which comprises flexible metal strips, onto a conveyor 208, which leads to the depalleting apparatus. The pallets from the lower conveyor 202 pass from the end of that conveyor onto the end of conveyor 208, and travel beneath the slideway 207, lifting the ends of the strips.

Figure 13:
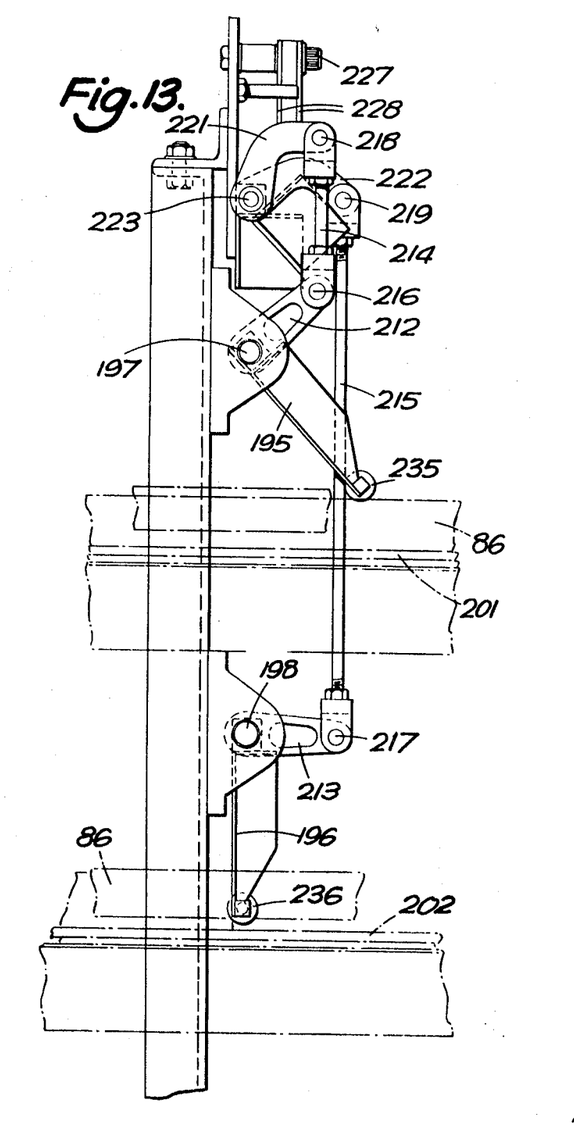
FIG. 13 is a side view of a pallet control unit for use with the apparatus of FIG. 12.
Figure 14:
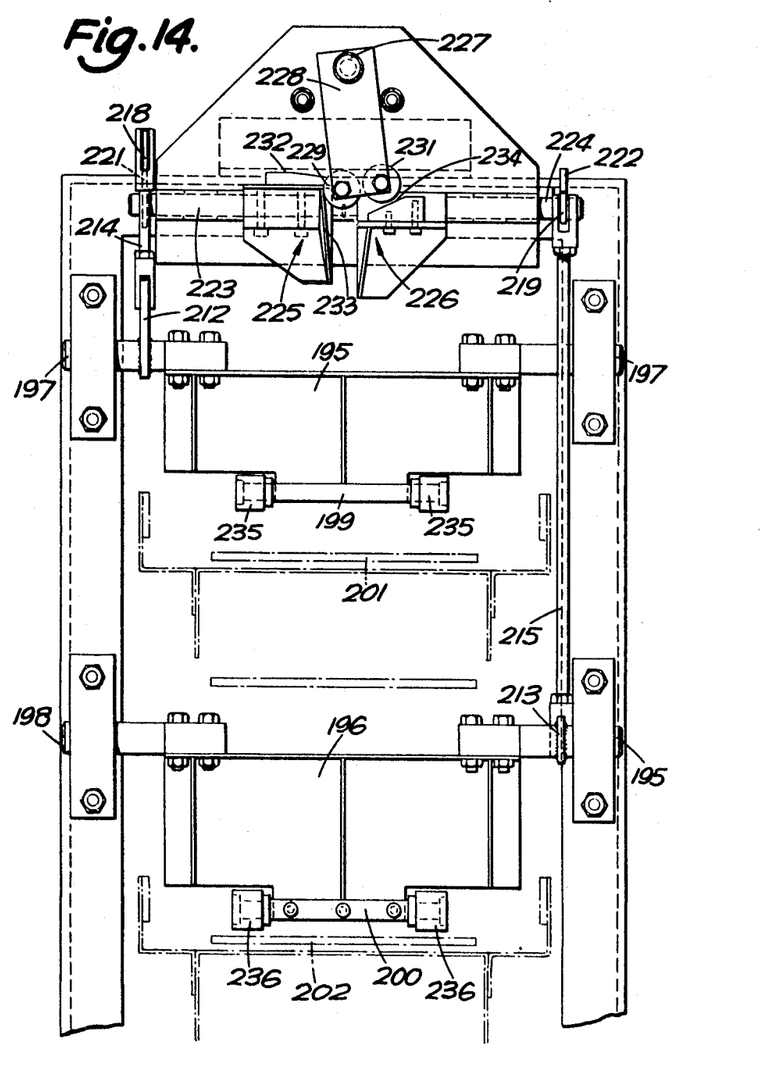
FIG. 14 is an end view of the pallet control unit shown in FIG. 13.

The control unit is shown in greater detail in FIGS. 13 and 14. Pivoted on a frame 211 around the conveyors 201, 202 are two plates 195, 196, with their pivotal axes 197, 198 extending across the conveyors. At their lower ends the plates have axles 199, 200 carrying roller 235, 236 which engage the tiles and pallets 86.

Attached to the plates 195, 196 are levers 212, 213 and rods 214, 215 are pivotally connected to the levers at 216, 217 at the sides of the conveyor. At their upper ends 218, 219, the rods are attached to lever 221, 222, pivoted on axles 223, 224. The axles extend towards the center of the conveyor, and at their ends carry mirror-image cam plates 225, 226.

From a pivot 227 above the center of the conveyors, symmetrically disposed with relation to the cam plates 225, 226 hang two plates 228 carrying rollers 229, 231.

When no tiles are on the conveyor, both plates 195, 196 hang vertically, as plate 196 does in the Figures of this example. Both cam plates 225, 226 are then in the position of cam plate 226, and the plates 228 hang freely. As a pallet and tile 86 travel along a conveyor, say conveyor 201, they strike the plate 195 and tilt it to the position shown, so that the pallet and tile can pass beneath it. By the system of rods and levers 212, 214, 221, the axle 223 is rotated anticlockwise, a seen in FIG. 13, and rotates the cam plate 225. The bearing surface 232 engages roller 229, and the plates 228 are moved to the position shown. The roller 229 is then resting against bearing surface 233, so that the plates 228 cannot move to the left, and roller 231, bearing against surface 234, prevents cam plate 226 rotating. Thus plate 196 is prevented from rotating about its axis 198, so that no tiles can travel on conveyor 202. Once tiles are no longer passing under roller 235, the cam plate 225 drops, so that cam plate 226, and hence plate 196, can lift, allowing tiles to pass on conveyor 202, while conveyor 201 is blocked in the same manner as described above.

Thus the control unit controls tiles so that they can only pass the unit on one conveyor at a time, so that the two unsynchronized streams entering by conveyor 201, 202 are synchronized, and pallets do not stack on top of each other on conveyor 208.

It will be understood that the apparatus described above is capable of modifications, one or two of which have been referred to, which lie within the scope of the invention.

I claim:

1. Apparatus for splitting a single stream of 'green' tiles on pallets into two streams, comprising a first conveyor on which the single stream of pallets is carried with the side edges of the pallets projecting laterally from the conveyor, and a second conveyor having a path which diverges upwardly relative to the path of the first conveyor and which has means to engage beneath the side edges of certain pallets to carry those pallets away from the first conveyor while the remaining pallets continue on the first conveyor, means being provided to synchronize in timed relationship the positions of the pallets on the first conveyor and the engaging means on the second conveyor, wherein the second conveyor comprises a pair of contrarotating endless chains situated one on each side of the first conveyor and spaced apart to permit the passage between them of a pallet on the first conveyor, the chains moving in substantially the same plane as each other, and each chain having pallet-engaging lifter sections fixed to it at intervals along its length positioned to correspond with lifter sections on the other chain, each lifter section including at least one roller engageable with a fixed track so as to support the lifter section while conveying a pallet.

2. Apparatus as claimed in claim 7 wherein the pallet engaging lifter sections are also engageable against the sides edges of each pallet.

3. Apparatus as claimed in claim 1 wherein the spacing between successive lifter sections on each chain is such as to permit the passage of at least one pallet along the first conveyor without lifting such pallet or pallets.

4. Apparatus as claimed in claim 3 wherein each lifter section comprises a series of units arranged together along each chain, each unit having an upright portion with means for attachment to each chain, a support portion to support a pallet, and a roller to engage the fixed track.

5. Apparatus as claimed in claim 4, wherein the support portion of each unit is adjustable so that each lifter section gives uniform support to a pallet having a curved longitudinal section at the side edge thereof.

6. Apparatus as claimed in claim 1 wherein the first conveyor comprises a pair of parallel ropes spaced to support the pallets adjacent to and spaced from their side edges, a further chain parallel to the ropes and having dogs at intervals along the length thereof to engage the pallets supported by the ropes, and means to drive the further chain at a speed higher than that of the ropes by an amount such that, before the pallets reach the second conveyor, each pallet will be overtaken and drivably engaged by a dog despite irregularities in the supply of pallets to the conveyor.

7. Apparatus as claimed in claim 1 wherein a third conveyor is provided to receive and carry the pallets removed from the first conveyor by the second conveyor.